US011926519B2

(12) United States Patent
Varini

(10) Patent No.: US 11,926,519 B2
(45) Date of Patent: Mar. 12, 2024

(54) DISPENSING PUMP FOR FUEL VENDING SYSTEMS

(71) Applicant: PIUSI S.P.A., Suzzara (IT)

(72) Inventor: Otto Varini, Suzzara (IT)

(73) Assignee: PIUSI S.P.A., Suzzara (IT)

( * ) Notice: Subject to any disclaimer, the term of this patent is extended or adjusted under 35 U.S.C. 154(b) by 229 days.

(21) Appl. No.: 17/503,609

(22) Filed: Oct. 18, 2021

(65) Prior Publication Data

US 2022/0127130 A1 Apr. 28, 2022

(30) Foreign Application Priority Data

Oct. 22, 2020 (IT) ........................ 202020000005914

(51) Int. Cl.

*B67D 7/76* (2010.01)
*B67D 7/30* (2010.01)
*B67D 7/56* (2010.01)
*B67D 7/66* (2010.01)
*F02M 59/28* (2006.01)
*F02M 59/44* (2006.01)
*F04D 29/40* (2006.01)

(Continued)

(52) U.S. Cl.

CPC ............... *B67D 7/308* (2013.01); *B67D 7/56* (2013.01); *B67D 7/66* (2013.01); *B67D 7/76* (2013.01); *F02M 59/28* (2013.01); *F02M 59/44* (2013.01); *F04D 29/40* (2013.01); *F04D 29/426* (2013.01); *F04D 29/4293* (2013.01); *F04D 29/605* (2013.01); *F04D 29/70* (2013.01); *F04D 29/708* (2013.01)

(58) Field of Classification Search

CPC . B67D 7/308; B67D 7/56; B67D 7/66; B67D 7/76; F04D 29/605; F04D 29/40; F04D 29/426; F04D 29/708; F04D 29/70

See application file for complete search history.

(56) References Cited

U.S. PATENT DOCUMENTS 3,159,310 A * 12/1964 Rafferty ................. B67D 7/763 222/73
3,266,425 A * 8/1966 Brunson ................ B67D 7/763 417/310

(Continued)

FOREIGN PATENT DOCUMENTS

EP 0 701 062 A1 3/1996
EP 2 241 533 A1 10/2010

(Continued)

OTHER PUBLICATIONS

Extended European Search Report dated Feb. 22, 2022 received in European Application No. 21 20 2608.2.

*Primary Examiner* — Courtney D Heinle
*Assistant Examiner* — Andrew J Marien
(74) *Attorney, Agent, or Firm* — Scully, Scott, Murphy & Presser, P.C.

(57) ABSTRACT

A dispensing pump for fuel vending systems, comprising a pump body which forms internally a pumping chamber, which rotatably accommodates an impeller, functionally connected to a motor, and provided with an intake connector and a delivery connector, which communicate with the pumping chamber and can be connected to a fuel dispensing line; the pump body has at least one coupling portion for at least one auxiliary device of the dispensing line.

9 Claims, 1 Drawing Sheet

(51) Int. Cl.

| | |
|---|---|
| ***F04D 29/42*** | (2006.01) |
| ***F04D 29/60*** | (2006.01) |
| ***F04D 29/70*** | (2006.01) |

(56) References Cited

U.S. PATENT DOCUMENTS

| | | | | | |
|---|---|---|---|---|---|
| 3,737,017 | A * | 6/1973 | Brunone | G07F 15/04<br>194/218 |
| 3,981,335 | A * | 9/1976 | Deters | B67D 7/0484<br>96/194 |
| 5,122,264 | A * | 6/1992 | Mohr | B67D 7/76<br>210/111 |
| 5,799,940 | A * | 9/1998 | Tripp | A63F 7/048<br>273/144 R |
| 2014/0069851 | A1* | 3/2014 | Larsson | B01D 29/23<br>210/94 |
| 2014/0227082 | A1* | 8/2014 | Ohashi | F02M 37/50<br>415/121.2 |
| 2017/0283239 | A1* | 10/2017 | Carapelli | B67D 7/08 |
| 2019/0016584 | A1* | 1/2019 | Londoño Ortiz | B67D 7/221 |
| 2019/0326798 | A1* | 10/2019 | Buerger | F04D 29/5893 |

FOREIGN PATENT DOCUMENTS

| | | | | |
|---|---|---|---|---|
| EP | 2241533 | A1 * | 10/2010 | B67D 7/62 |
| WO | 2007/036754 | A1 | 4/2007 | |

* cited by examiner

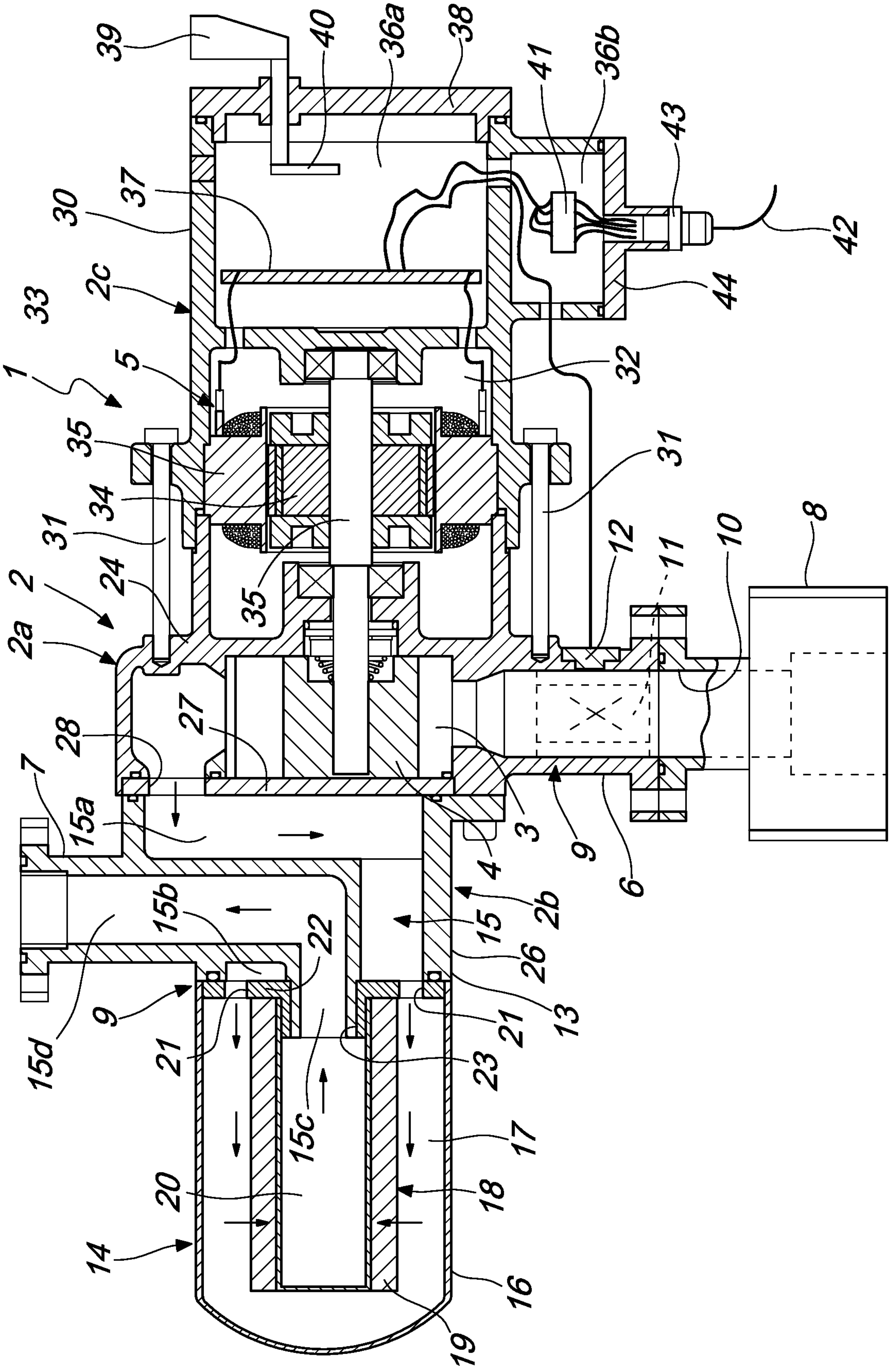
39
40
36a
38
41
36b
43
42
44
30
37
2c
33
1
5
32
35
34
31
31
2
24
35
12
11
10
8
2a
27
28
3
9
6
7
15a
4
2b
15b
22
15
26
21
13
9
21
23
15d
15c
17
20
18
14
16
19

DISPENSING PUMP FOR FUEL VENDING SYSTEMS

The present invention relates to a dispensing pump for fuel vending systems.

As is known, fuel vending systems are typically provided with one or more dispensing units, which allow users to refuel their vehicles with a specific type of fuel, such as gasoline, diesel fuel, methane gas or LPG.

Each dispensing unit is commonly constituted by a dispensing assembly which comprises a fuel containment tank and a dispensing line, which draws from the tank by means of a dispensing pump and is connected in output to a dispensing nozzle for introducing the fuel in the tank of the vehicles.

Auxiliary devices for controlling the correct operation of the dispensing line, such as for example a filter and a device for measuring the flow rate or the amount of fuel dispensed, are usually arranged along the dispensing line.

The dispensing assemblies of the dispensing units that are present in vending systems are susceptible of improvements.

In particular, the need is felt to render the dispensing assemblies constructively less complex, simpler to manage, dimensionally more compact and more convenient to maintain.

The aim of the present invention is to provide a dispensing pump for fuel vending systems that is capable of improving the background art in one or more of the aspects indicated above.

Within this aim, an object of the invention is to provide a dispensing pump for fuel vending systems that offers the possibility to simplify and render more compact the dispensing units of fuel vending systems.

Another object of the invention is to provide a dispensing pump for fuel vending systems that allows easy maintenance of the dispensing units of fuel vending systems.

A further object of the present invention is to provide a dispensing pump for fuel vending systems that is particularly compact and easy to apply.

Another object of the present invention is to provide a dispensing pump for fuel vending systems that is constructively simple to provide.

Another object of the invention is to provide a dispensing pump for fuel vending systems that offers the greatest assurances of reliability and safety in operation.

A further object of the present invention is to overcome the drawbacks of the background art in a manner that is alternative to any existing solutions.

Not least object of the invention is to provide a dispensing pump for fuel vending systems that can be manufactured at low cost, so as to be competitive also from a purely economic standpoint.

This aim, as well as these and other objects which will become better apparent hereinafter, are achieved by a dispensing pump for fuel vending systems according to claim 1, optionally provided with one or more of the characteristics of the dependent claims.

Further characteristics and advantages of the invention will become better apparent from the description of a preferred but not exclusive embodiment of the dispensing pump for fuel vending systems according to the invention, illustrated by way of non-limiting example in the accompanying drawings, wherein:

FIG. 1 is a sectional side view of the dispensing pump for fuel vending systems according to the invention.

With reference to the FIGURE, the dispensing pump for fuel vending systems according to the invention, designated generally by the reference numeral 1, comprises a pump body 2, which forms internally a pumping chamber 3, inside which an impeller 4 is rotatably accommodated and is functionally connected to motor means 5.

The pump body 2 furthermore has an intake connector and a delivery connector 7, which communicate with the pumping chamber 3 and can be connected to a liquid fuel dispensing line.

For example, the intake connector 6 can be connected to a body 8 for coupling to a liquid fuel tank, while the delivery connector 7 can be connected to a duct which leads into a dispensing nozzle.

The pump body 2 has at least one coupling portion 9 for at least one auxiliary device of the dispensing line to which the pump is connected.

In particular, the coupling portion 9 can advantageously comprise at least one accommodation seat 10 for at least one liter counter 11.

Preferably, the accommodation seat 10 is formed substantially between the intake connector 6 and the pumping chamber 3 and more preferably is formed substantially coaxially to the intake connector 6.

For example, the liter counter 11 can be constituted by a turbine which is mounted so that it can rotate along the axis of the accommodation seat 10 and cooperates with a sensor element 12 which is fixed to the outer wall of the intake connector 6.

Advantageously, the coupling portion 9 can also comprise at least one coupling region 13 for at least one filter 14.

In particular, the coupling region 13 is conveniently formed along at least one delivery duct 15, which in turn is formed in the pump body 2 and is extended from the pumping chamber 3 toward the delivery connector 7.

Conveniently, the filter 14 is provided by a filtration cartridge, which has a substantially cylindrical external enclosure 16 which is closed at one end and can be coupled, at the other end, to the coupling region 13 by interlocking, screw coupling or in other ways.

In greater detail, the external enclosure 16 forms internally a filtration chamber 17, which accommodates axially a filtering body 18 which is internally hollow and provided with a substantially cylindrical filtration wall 19, through which the liquid to be filtered, which arrives from the filtration chamber 17, flows and which delimits internally a filtered liquid collection chamber 20.

Advantageously, the delivery duct 15 comprises a first portion 15*a* which is extended from the pumping chamber 3 and leads into a distribution portion 15*b*, which communicates with the filtration chamber 17 of the filter 14 by means of access ports 21, for the entry of the fluid fuel into the filtration cartridge of the filter 14.

In particular, the access ports 21 are arranged between the filtering body 18 and the side wall of the external enclosure 16 and are formed conveniently in a cap 22 for closing the end of the external enclosure 16 of the filter 14 which is coupled to the coupling region 13 and is interposed between the distribution portion 15*b* and the inside of the cartridge of the filter 14.

The delivery duct 15 furthermore has a second portion 15*c* which communicates with the filtered liquid collection chamber 20 through a communication opening 23 formed centrally in the cap 22, and with the delivery connector 7, for example by means of a third portion 15*d*, and which is arranged axially to the distribution portion 15*b*, so that the distribution portion 15*b* and the second portion 15*c* are arranged substantially coaxially to each other.

Conveniently, the connection between the pumping chamber 3 and the delivery duct 15 is provided by an output opening 28, which in particular connects the pumping chamber 3 to the first portion of the delivery duct 15.

Advantageously, the pump body 2 is provided in at least two parts which are mutually assembled, respectively at least one first part 2*a*, which comprises a main body 24, which forms internally at least the pumping chamber 3 and the intake connector 6, and at least one second part 2*b*, which comprises at least one head 26, which forms the delivery duct 15 and is provided with the delivery connector 7.

Conveniently, between the main body 24 and the head 26 there is an interposed cover 27 for closing the pumping chamber 3, in which the output opening 28 is formed which connects the pumping chamber 3 to the first portion 15*a* of the delivery duct 15.

Advantageously, the axis of the output opening 28 is oriented substantially at right angles to the axis of the delivery connector 7.

It should be noted that the intake connector 6 and the delivery connector 7 are arranged with their axes substantially parallel to each other and laterally spaced.

More particularly, the third portion 15*d* of the delivery duct 15 is aligned with the delivery connector 7 and is parallel and laterally adjacent to the first portion 15*a* of the delivery duct 15, which in turn is extended substantially parallel to the axis of the intake connector 6 and of the delivery connector 7.

The first portion 15*a* and the third portion 15*d* of the delivery duct 15 are consequently perpendicular to the axis of the output opening 28 of the pumping chamber 3, while the second portion 15*c* of the delivery duct 15 is oriented substantially parallel to the axis of the output opening 28 and substantially at right angles to the axis of the third portion 15*d* of the delivery duct 15.

Conveniently, a containment body 30 is fixed to the main body 24 of the pump body 2, on the opposite side with respect to the head 26, and in practice constitutes a third part 2*c* of the pump body 2 and is for example connected to the first part 2*a* of the pump body 2 constituted by the main body 24 by means of tension members 31.

In particular, the containment body 30 forms at least one part of an accommodation chamber 32 for the motor means 5 which, for the remaining part, is instead formed by the main body 24.

Advantageously, the motor means 5 comprise an electric motor constituted by a stator 33, which is fixed to the walls of the accommodation chamber 32, and by a rotor 34, which is arranged inside the stator 33 and is mounted around an actuation shaft 35, which is connected to the impeller 4 and rotatably supported by the main body 24 and by the containment body 30.

At least one accommodation chamber for power supply and control means of the motor means 5 is furthermore formed in the containment body 30.

More particularly, in the containment body 30 there is conveniently at least one first accommodation chamber 36*a* which accommodates an electronic circuit board 37 connected to the motor means 5 and to the sensor element 12.

Conveniently, the first accommodation chamber 36*a* is closed by a cover 38 on which for example an actuation lever system 39 is mounted which is connected to a switch 40 and can be actuated by the user to control the starting or shutdown of the pump.

A second containment chamber 36*b* also is formed in the containment body 30 and accommodates a terminal strip 41 which is connected to the electronic board 37 and to a power supply cable 42, which is connected to an outlet 43 which is provided for example on a closure cover 44 of the second containment chamber 36*b*.

The operation of the pump, according to the invention, is as follows.

By means of the actuation of the actuation lever system 39, the pump is turned on, with consequent rotational actuation of the impeller 4.

The liquid fuel is then drawn by means of the coupling body 8 and enters the pump through the intake connector 6.

Before reaching the pumping chamber 3, the flow of the liquid fuel passes through the liter counter 11, so that the flow rate of the liquid fuel can be detected by the electronic board 37.

Once it has reached the pumping chamber 3, the liquid fuel is sent to the delivery duct 15 through the output opening 28.

In particular, the flow of the liquid fuel enters the first portion 15*a* of the delivery duct 15 and reaches the distribution portion 15*b*, by means of which it is introduced in the filtration chamber 17 of the filter 14 through the access ports 21.

At this point the liquid fuel passes through the filtration wall 19 of the filtering body 18, reaching the filtered liquid collection chamber 20, from which it exits through the communication opening 23, so as to enter the second portion 15*c* and reach the delivery connector 7 via the third portion 15*d* of the delivery duct 15.

The above description allows to understand that the invention is capable of achieving the intended aim and objects, since it allows to associate with the pump body the auxiliary devices that are useful for controlling the flow of the liquid fuel that passes through the dispensing line to which the pump according to the invention is connected.

The invention thus conceived is susceptible of numerous modifications and variations, all of which are within the scope of the appended claims; all the details may furthermore be replaced with other technically equivalent elements.

In practice, the materials used, as well as the contingent shapes and dimensions, may be any according to the requirements and the state of the art.

The disclosures in Utility Model Application No. 202020000005914 from which this application claims priority are incorporated herein by reference.

What is claimed is:

1. A dispensing pump for fuel vending systems, comprising a pump body which forms internally a pumping chamber, which rotatably accommodates an impeller, functionally connected to motor means, and provided with an intake connector and a delivery connector, which communicate with said pumping chamber and is configured to be connected to a fuel dispensing line, wherein said pump body has at least one coupling portion for at least one auxiliary device of said dispensing line wherein said coupling portion comprises at least one coupling region for at least one filter characterized in that said coupling region is formed along at least one delivery duct, which is formed in said pump body and extends from said pumping chamber toward said delivery connection.

2. The dispensing pump according to claim 1, characterized in that said coupling portion comprises at least one accommodation seat for at least one liter counter.

3. The dispensing pump according to claim 2, characterized in that said accommodation seat is formed between said intake connector and said pumping chamber.

4. The dispensing pump according to claim 1, characterized in that said pump body comprises at least two mutually assembled parts, respectively at least one first part, which comprises a main body, which forms internally at least said pumping chamber and is provided with said intake connector, and at least one second part, which comprises at least one head which forms said delivery duct and is provided with said delivery connector.

5. The dispensing pump according to claim 1, characterized in that said filter comprises a filtration cartridge, provided with a cylindrical external enclosure, which is closed at one end and can be coupled, at an other end, to said coupling region, said external enclosure forming internally a filtration chamber which accommodates axially a filtering body, which is internally hollow and provided with a cylindrical filtration wall which delimits a filtered liquid collection chamber.

6. The dispersing pump according to claim 5, characterized in that a delivery duct comprises a first portion which extends from said pumping chamber and leads into a distribution portion, which communicates with a filtration chamber by means of access ports arranged between said filtering body and a side wall of said external enclosure, and a second portion, which communicates with said filtered liquid collection chamber and with said delivery connector and is arranged axially to said distribution portion.

7. The dispensing pump according to claim 1, characterized in that said pumping chamber communicates with said delivery duct via an output opening, the axis of said output opening being oriented at right angles to an axis of said delivery connector.

8. The dispensing pump according to claim 4, characterized in that a cover for closing said pumping chamber which forms said output opening is interposed between said main body and said head.

9. The dispensing pump according to claim 8, characterized in that is comprises, on an opposite side with respect to said head, a containment body, which is fixed to said main body and forms at least one portion of an accommodation chamber for a motor means and at least one accommodation chamber for power supply and control means of said motor means.

* * * * *